May 12, 1931.  H. LINDBLAD  1,804,506
DRILL CHUCK
Filed Sept. 17, 1928
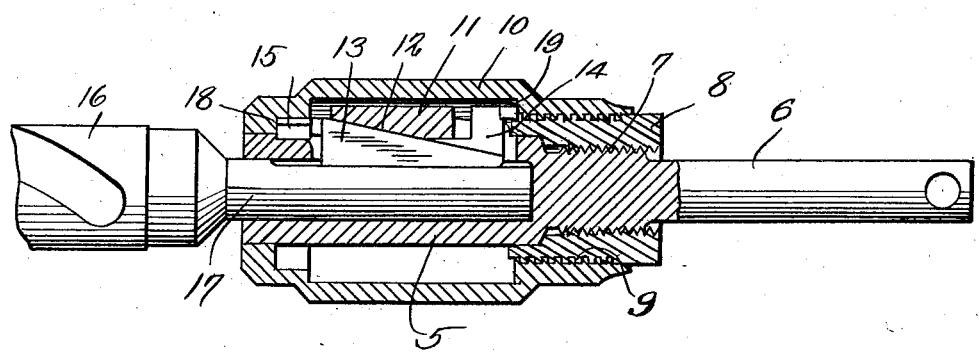
Fig. 1.
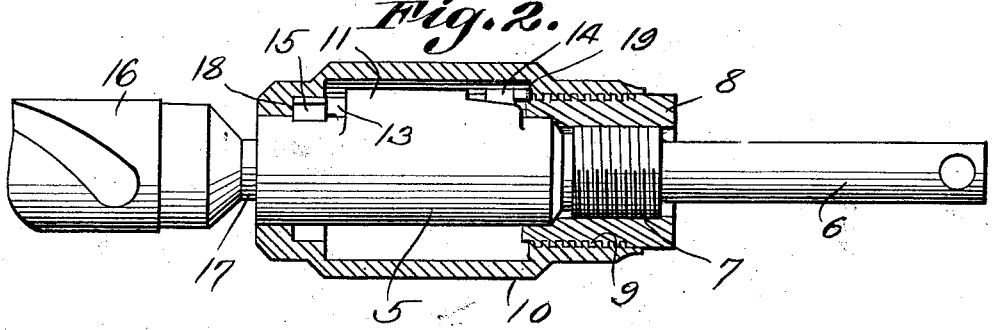
Fig. 2.
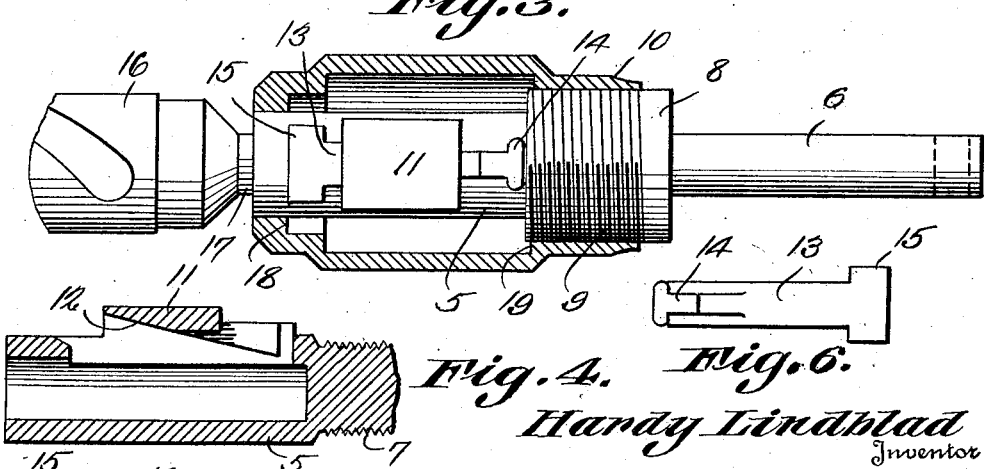
Fig. 3.
Fig. 4.   Fig. 6.
Fig. 5.
Hardy Lindblad
Inventor
By C. A. Snow & Co.
Attorneys Patented May 12, 1931

1,804,506

UNITED STATES PATENT OFFICE

HARDY LINDBLAD, OF FREDERIC, WISCONSIN

DRILL CHUCK

Application filed September 17, 1928. Serial No. 306,413.

This invention relates to drill chucks, the primary object of the invention being to provide a drill chuck wherein drills may be inserted or removed from the drill chuck with facility.

An important object of the invention is to provide a drill chuck which will absolutely insure against lateral movement of the drill held therein so that the drill may accurately accomplish the drilling operation.

A further object of the invention is to provide a locking means for locking a drill shank to the chuck in such a way that the drill may be removed without the use of wrenches.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a longitudinal sectional view through a drill chuck constructed in accordance with the invention.

Figure 2 is a longitudinal sectional view through the chuck, the main portion of the chuck being shown in elevation.

Figure 3 is a longitudinal sectional view of a chuck showing the main portion of the chuck in plan.

Figure 4 is a longitudinal sectional view through a portion of the body member.

Figure 5 is an elevational view of the key.

Figure 6 is a side elevation of the same.

Referring to the drawing in detail, the reference character 5 designates the body portion of the chuck, which is hollow and provided with an extension 6.

Threads indicated at 7 are formed on the body portion and are designed to cooperate with the internal threads of the nut 8 which is also provided with external threads 9 that cooperate with threads formed at one end of the shell 10, for purposes to be hereinafter more fully described.

As shown more clearly by Figure 1 of the drawing, the body portion is provided with an offset portion 11 that has an inclined inner surface 12 acting as a cam to engage the inclined upper edge of the key 13 that is positioned in the hollow body portion.

Openings are formed at the ends of the offset portion 11 to permit the key 13 to be inserted thereunder. The opening at one end of the offset portion is substantially key hole shaped to receive the T shaped extremity of the upstanding lug 14 of the key, the length of the lug being such that the T shaped portion of the lug will ride over the surfaces of the body portion adjacent to the key hole slot to hold the key in an elevated or inactive position when it has been moved to release the drill shank positioned in the body portion.

A transverse piece 15 is formed at the opposite end of the key and contacts with the upper surface of the body portion to hold this end of the key in an elevated position and prevent it from dropping into the body portion.

The drill is indicated by the reference character 16, the shank thereof being shown at 17 and provided with a flat surface to be engaged by one edge of the key 13 as shown by Figure 1 of the drawing, to lock the drill within the drill chuck.

When the drill chuck is assembled, it will be obvious that the ends of the key lie within the cut out portions of the shell, or at points adjacent to the shoulders 18 and 19 respectively, with the result that when it is desired to release the drill, it is only necessary to hold the extension 6 of the body portion against rotary movement and rotate the shell in an anti-clockwise direction, whereupon the T shaped extremity of the lug 14 of the key will contact with the shoulder 19 to move the key towards the drill, releasing the drill.

When it is desired to insert a drill into the chuck the drill is positioned in the open end of the chuck and the shell rotated in a clockwise direction causing the shoulder 18 to engage the opposite end of the key to move the key in such a way as to set up a binding action between the key, drill shank and inclined surface of the offset portion 11, thereby securing the drill within the chuck.

I claim:

A drill chuck comprising a body portion having a hollow end formed with an elongated offset portion and having openings at the ends of the elongated offset portions, the inner surface of the offset portion being inclined, a key having an inclined surface engaging the inclined surface of the offset portion, and having enlargements at the ends of the key extended through the openings of the body portion, said key adapted to engage the shank of a drill positioned in the hollow end of the body portion to secure the drill against movement, a shell surrounding the hollow end of the body portion and engaging one of the enlargements of the key to force the key longitudinally of the body portion, and a nut on the body portion for moving the shell into engagement with the key.

In testimony that I claim the foregoing as my own, I have hereto affixed my signature.

HARDY LINDBLAD.